May 18, 1954  R. A. GRIEFEN  2,678,837
BEARING SEAL
Filed Aug. 19, 1952

Inventor:
RICHARD A. GRIEFEN
By Jack M. Wiseman
Attorney

Patented May 18, 1954

2,678,837

UNITED STATES PATENT OFFICE 2,678,837

BEARING SEAL

Richard A. Griefen, Arlington Heights, Ill., assignor to Raytheon Manufacturing Company, a corporation of Delaware Application August 19, 1952, Serial No. 305,233

4 Claims. (Cl. 286—11.14)

This invention relates in general to bearing seals and more particularly to bearing seals having O rings.

In packing boxes of the type used in submarines and in bearing seal assemblies, in general, wherein O rings are utilized, there is excessive friction that causes considerable losses. Further, in such assemblies the torque distribution is not uniform, causing locking and excessive wear on certain parts thereof.

Accordingly, an important object of the present invention is to provide a bearing seal having a plurality of O rings retained in a tapered ring for providing uniform torque distribution.

Another object of the present invention is to provide a bearing seal causing a reduction in torque requirements for rotation as pressure applied to a fluid is decreased and still maintain a complete seal at any pressure that may be applied to a fluid.

Figure 1:
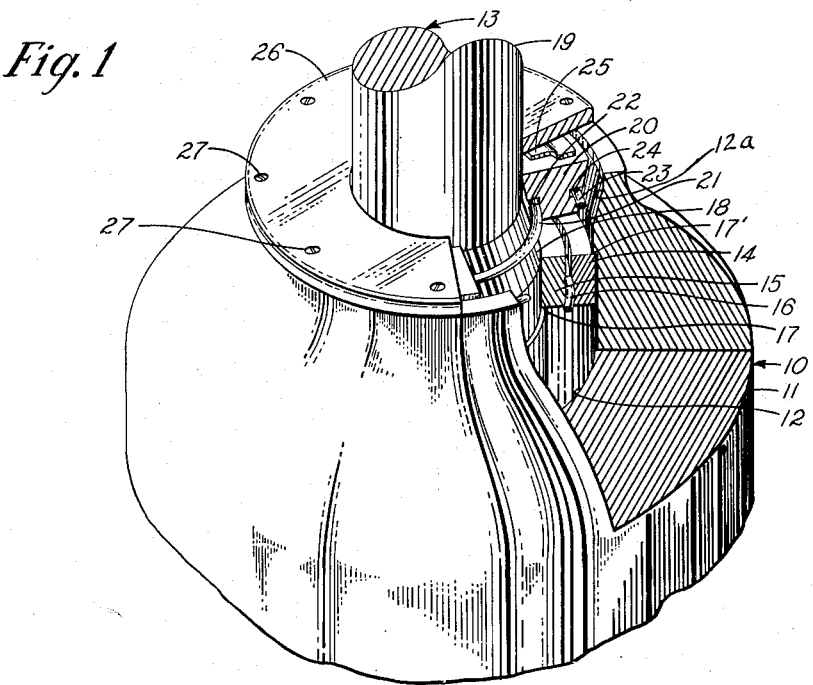
Figure 2:
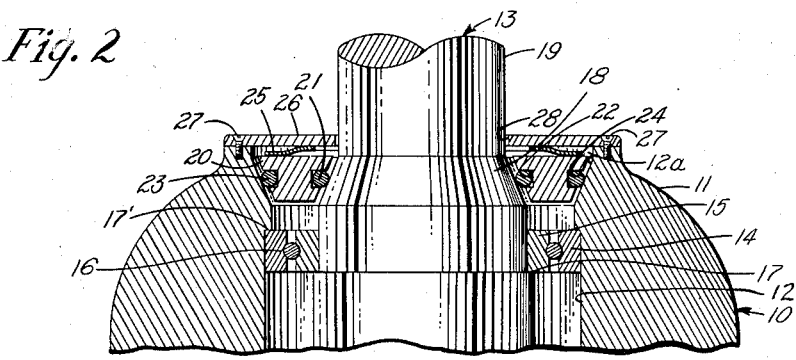

Other objects and features will appear upon further perusal of the detailed description taken in conjunction with the accompanying drawings in which:

Figure 1 is a perspective view of the novel bearing seal of the present invention having a cutaway section to illustrate the O ring assembly thereof; and Figure 2 is a partial sectional view taken substantially along the line 2—2 of Figure 1 to illustrate the plurality of O rings held in a tapered ring.

Briefly described, a novel bearing seal is herein provided comprising a tapered retaining ring having a trapezoidal cross section and positioned in a counterbore between a tapered portion of a rotatable shaft and an outer housing.

An inner O ring is fitted in a groove of the tapered retaining ring and engage the tapered portion of the shaft for providing a seal. An outer O ring is fitted in a groove of the tapered retaining ring and engages the outer housing for providing a seal.

For providing a minimum sealing engagement, a pressure retaining spring engages the tapered ring to maintain a minimum pressure thereon. The spring abuts against a cap attached to the outer housing for positioning.

As the pressure on the fluid is increased, the pressure is applied to the tapered retaining ring causing a greater sealing effect between the O rings and the elements in engagement therewith. As the pressure on the fluid decreases, the torque requirements on the shaft are commensurately decreased, since the tapered ring relaxes the squeeze between the O rings and the components in engagement therewith. The pressure retaining spring always maintains a minimum sealing effect.

Referring now to Figures 1 and 2, a conventional packing box 10 is herein provided having a suitable outer housing or chamber 11 with a suitable bore 12 therethrough. A suitable rotatable shaft 13 is provided which is suitably received by the housing 11.

For maintaining a seal between the shaft 13 and the outer housing 11 so as to prevent any fluid from passing therebetween, a conventional outer O ring retaining member 14 and a conventional inner O ring retaining member 15 having therebetween an O ring 16 are provided. The inner O ring retaining member 15 abuts against a shoulder 17 in the shaft 13. The outer O ring retaining member 14 abuts against a shoulder 17' in the outer housing 11.

The shaft 13 has a tapered portion 18 which is integrally formed with a decreased diameter portion 19. The tapered portion 18 of the shaft 13 is received by a suitable counterbore 12a and the decreased diameter portion 19, which extends out of the packing box 10.

According to the invention, for providing a bearing seal that is responsive to fluid pressure so as to provide improved torque requirements, a tapered retaining ring 20 is herein provided having a trapezoidal cross section. The tapered ring 20 is positioned between the tapered portion 18 of the shaft 13 and the portion of the outer housing 11 having the counterbore 12a therethrough. The contour of the tapered ring 20 conforms to the contour of the outer housing 11 and the tapered portion 18 of the shaft 13.

For providing an inner seal, an inner O ring 21 is suitably positioned in a groove 22 of the tapered retaining ring 20 and engages the tapered portion of the shaft 13. For providing an outer seal, an outer O ring 23 is suitably positioned in a groove 24 of the tapered retaining member 20 and engages the outer housing 11.

For maintaining a minimum sealing pressure on the tapered ring 20 so as to provide an adequate seal under all conditions, a suitable pressure retaining spring 25 of the compression type engages the tapered ring 20 to provide a minimum pressure thereon. Abutting the pressure retaining spring 25 is a suitable cap 26, which is secured to the outer housing 11 by suitable means, such as screws 27. An aperture 28 is provided in the cap 26 for suitably receiving the decreased diameter portion 19 of the shaft 13.

In operation, a fluid under pressure is applied from the cap end 26 of the packing box 10. The greater the pressure on the fluid, the greater the sealing effect. Since the fluid engages the face of the tapered retaining ring 20 engaging the pressure retaining spring 25, the pressure bearing thereon causes a downward motion to force the O rings 21 and 23 in a closer contact relationship with the rotatable shaft 13 and the outer housing 11, respectively.

As the pressure on the fluid is decreased, the pressure on the tapered ring 20 is decreased to release the squeeze caused by the O rings 21 and 23 engaging the rotatable shaft 13 and the outer housing 11, respectively. The effect, therefore, is to provide a desirable sealing engagement at all times and yet decrease the squeeze to lower the torque requirements on the rotatable shaft 13. Of course, the pressure retaining spring 25 engaging the tapered ring 20 maintains a minimum sealing engagement. The advantage gained by the present invention is noteworthy in that it provides better torque distribution and tends to lessen locking.

It is to be understood that variations and modifications may be effected without departing from the scope of the appended claims.

I claim:

1. In a bearing seal assembly, an outer housing having a counterbore therethrough, a rotatable shaft received by said counterbore and having a tapered portion thereon, a tapered retaining ring positioned between the tapered portion of said shaft and said outer housing and having a contour conforming to the contour of said tapered portion and said counterbore, a surface on said tapered retaining ring for applying fluid pressure thereon for variably positioning said tapered ring in response to fluid pressure, and a plurality of O rings in said tapered retaining ring engaging said shaft and said outer housing for providing a sealing engagement therewith in response to fluid pressure.

2. In a bearing seal assembly, an outer housing having a counterbore therein, a rotatable shaft received by said counterbore and having a tapered portion thereon, a retaining ring having a trapezoidal cross sectional area positioned between the tapered portion of said shaft and said outer housing and having a contour conforming to said tapered portion and said counterbore, an inner O ring in said retaining ring engaging the tapered portion of said shaft for providing a sealing engagement therewith, an outer O ring in said retaining ring engaging said outer housing for providing a sealing engagement therewith, and a surface on said retaining ring for applying fluid pressure thereon for variably positioning said retaining ring in response to fluid pressure, said retaining ring causing increased sealing engagement in response to increase in fluid pressure and enabling decrease in squeeze between said inner O ring and said shaft in response to decrease in fluid pressure.

3. In a bearing seal assembly, an outer housing having a counterbore therethrough, a rotatable shaft received by said counterbore and having a tapered portion thereon, a tapered retaining ring positioned between the tapered portion of said shaft and said outer housing and having a contour conforming to the contour of said tapered portion and said counterbore, a surface on said tapered retaining ring for applying fluid pressure thereon for variably positioning said tapered ring in response to fluid pressure, a plurality of O rings in said tapered retaining ring engaging said shaft and said outer housing for providing a sealing engagement therewith in response to fluid pressure, and a pressure retaining spring engaging said surface on said tapered retaining ring for maintaining a minimum sealing engagement between said O rings and said shaft and said outer housing.

4. In a bearing seal assembly, an outer housing having a counterbore therein, a rotatable shaft received by said counterbore and having a tapered portion thereon, a retaining ring having a trapedoizal cross sectional area positioned between the tapered portion of said shaft and said outer housing and having a contour conforming to said tapered portion and said counterbore, an inner O ring in said retaining ring engaging the tapered portion of said shaft for providing a sealing engagement therewith, an outer O ring in said retaining ring engaging said outer housing for providing a sealing engagement therewith, a surface on said retaining ring for applying fluid pressure thereon for variably positioning said retaining ring in response to fluid pressure, said retaining ring causing increased sealing engagement in response to increase in fluid pressure and enabling decrease in squeeze between said inner O ring and said shaft in response to decrease in fluid pressure, and a pressure retaining spring engaging said surface on said retaining ring for maintaining a minimum sealing engagement between said inner O ring and said shaft, and said outer O ring and said outer housing.

References Cited in the file of this patent

UNITED STATES PATENTS

| Number | Name | Date |
| --- | --- | --- |
| 1,070,087 | Van Deventer | Aug. 12, 1913 |
| 1,825,004 | Livergood | Sept. 29, 1931 |
| 2,401,379 | Smith | June 4, 1946 |
| 2,616,453 | Green | Nov. 4, 1952 |